(12) United States Patent
Jeong et al.

(10) Patent No.: US 10,910,163 B2
(45) Date of Patent: Feb. 2, 2021

(54) MULTILAYER ELECTRONIC COMPONENT AND BOARD HAVING THE SAME MOUNTED THEREON

(71) Applicant: SAMSUNG ELECTRO-MECHANICS CO., LTD., Suwon-si (KR)

(72) Inventors: Dae Heon Jeong, Suwon-si (KR); Kyung Hwa Yu, Suwon-si (KR); Man Su Byun, Suwon-si (KR); Min Kyoung Cheon, Suwon-si (KR); Soo Hwan Son, Suwon-si (KR); Ho Yoon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 49 days.

(21) Appl. No.: 16/365,088

(22) Filed: Mar. 26, 2019

(65) Prior Publication Data
US 2020/0006003 A1    Jan. 2, 2020

(30) Foreign Application Priority Data

Jun. 29, 2018  (KR) .................. 10-2018-0075792
Aug. 1, 2018   (KR) .................. 10-2018-0089658

(51) Int. Cl.
*H01G 4/228*    (2006.01)
*H01G 4/30*     (2006.01)
(Continued)

(52) U.S. Cl.
CPC .............. *H01G 4/30* (2013.01); *H01G 2/065* (2013.01); *H01G 4/008* (2013.01); *H01G 4/1227* (2013.01); *H01G 4/228* (2013.01)

(58) Field of Classification Search
None
See application file for complete search history.

(56) References Cited

U.S. PATENT DOCUMENTS 5,870,273 A * 2/1999 Sogabe .................... H01G 4/40
                                                  361/306.3
5,999,398 A * 12/1999 Makl ....................... H01G 4/35
                                                  338/20
(Continued)

FOREIGN PATENT DOCUMENTS

JP   S58-220492 A   12/1983
JP   H04-188813 A   7/1992
(Continued)

OTHER PUBLICATIONS

Office Action issued in corresponding Korean Application No. 10-2018-0089658, dated May 29, 2019.
(Continued)

*Primary Examiner* — Dion Ferguson
(74) *Attorney, Agent, or Firm* — Morgan, Lewis & Bockius LLP

(57) ABSTRACT

A multilayer electronic component include a multilayer capacitor including a capacitor body and first and second external electrodes disposed on ends of the capacitor body, respectively; an alumina chip including a chip body and first and second external terminals disposed on ends of the chip body, respectively, the first and second external terminals being in contact with the first and second external electrodes, respectively; a first plating layer covering the first external electrode and the first external terminal; and a second plating layer covering the second external electrode and the second external terminal. The first and second plating layers each include a nickel plating layer a tin plating layer disposed on the first external electrode and the first external terminal and
(Continued)

on the second external electrode and the second external terminal, respectively.

20 Claims, 7 Drawing Sheets

(51) Int. Cl.
   *H01G 4/12* (2006.01)
   *H01G 2/06* (2006.01)
   *H01G 4/008* (2006.01)

(56) References Cited

U.S. PATENT DOCUMENTS

| | | | |
|---|---|---|---|
| 9,865,399 B2* | 1/2018 | Cho | H01G 4/30 |
| 10,128,050 B1* | 11/2018 | Park | H01G 4/232 |
| 2013/0343027 A1* | 12/2013 | Perea | H01C 1/14 |
| | | | 361/813 |
| 2014/0016242 A1 | 1/2014 | Hattori et al. | |
| 2014/0284089 A1* | 9/2014 | Hattori | H01G 4/232 |
| | | | 174/258 |
| 2015/0122534 A1* | 5/2015 | Park | H01G 2/065 |
| | | | 174/260 |
| 2015/0340154 A1* | 11/2015 | Kim | H01G 4/248 |
| | | | 174/260 |
| 2017/0105283 A1* | 4/2017 | Kim | H05K 1/0346 |
| 2018/0075974 A1* | 3/2018 | Hattori | H01G 4/40 |

FOREIGN PATENT DOCUMENTS

| | | |
|---|---|---|
| JP | 2000-260661 A | 9/2000 |
| JP | 2012-204572 A | 10/2012 |
| JP | 2014-207422 A | 10/2014 |
| JP | 2016-502273 A | 1/2016 |
| KR | 10-2015-0051668 A | 5/2015 |
| KR | 10-2015-0127965 A | 6/2016 |
| KR | 10-2017-0141631 A | 12/2017 |
| KR | 10-2018-0028928 A | 3/2018 |
| WO | 2014/081666 A1 | 5/2014 |

OTHER PUBLICATIONS

Japanese Office Action dated Mar. 10, 2020 issued in Japanese Patent Application No. 2019-067366 (with English translation).
Japanese Office Action dated Nov. 4, 2020 issued in Japanese Patent Application No. 2019-067366 (with English translation).

* cited by examiner

MULTILAYER ELECTRONIC COMPONENT AND BOARD HAVING THE SAME MOUNTED THEREON

CROSS-REFERENCE TO RELATED APPLICATION(S)

This application claims benefit of priority to Korean Patent Application Nos. 10-2018-0075792 filed on Jun. 29, 2018 in the Korean Intellectual Property Office, and 10-2018-0089658 filed on Aug. 1, 2018 in the Korean Intellectual Property Office, the disclosures of which are incorporated herein by reference in their entirety.

TECHNICAL FIELD

The present disclosure relates to a multilayer electronic component and a board having the same mounted thereon.

BACKGROUND

Since a dielectric material of a multilayer capacitor has piezoelectric properties, displacement may occur in synchronization with an applied voltage.

In this case, when a period of the applied voltage is within an audible range, the displacement is transmitted to a board by vibrations.

As a result, the board may act as an acoustic surface, the vibrations may be heard as a sound, and such a sound is known as acoustic noise. Such acoustic noise has been a problem in electronic devices.

For example, when an operating environment of a device is quiet, a user may perceive acoustic noise as a device failure, and when the acoustic noise is superimposed on an audio output in a device having an audio circuit, thereby deteriorating the quality of the device.

A portable terminal represented by a smartphone, or the like uses many multilayer capacitors.

In recent multilayer capacitors, while technologies of thinning and stacking dielectrics have advanced, according to miniaturization and high-capacity, such that electric performance is improved, mechanical deformation due to piezoelectricity is increasing.

Therefore, when an electric field intensity of a dielectric layer becomes high, according to thinning of the dielectric layer and the piezoelectricity becomes high, the acoustic noise may act as a noise source even at an AV voltage of less than 1V.

Therefore, technology capable of effectively further reducing the acoustic noise of the multilayer capacitor is required.

SUMMARY

An aspect of the present disclosure provides a multilayer electronic component and a board having the same mounted thereon, capable of reducing acoustic noise of a multilayer capacitor and high frequency vibrations.

According to an aspect of the present disclosure, a multilayer electronic component includes: a multilayer capacitor including a capacitor body and first and second external electrodes disposed on ends of the capacitor body, respectively; an alumina chip including a chip body and first and second external terminals disposed on ends of the chip body, respectively, the first and second external terminals being in contact with the first and second external electrodes, respectively; a first plating layer covering the first external electrode and the first external terminal; and a second plating layer covering the second external electrode and the second external terminal.

The first plating layer may include a first nickel plating layer disposed on the first external electrode and the first external terminal and a first tin plating layer disposed on the first nickel plating layer, and the second plating layer may include a second nickel plating layer disposed on the second external electrode and the second external terminal and a second tin plating layer disposed on the second nickel plating layer.

In an exemplary embodiment in the present disclosure, an overall length of the alumina chip may be shorter than an overall length of the multilayer capacitor.

In an exemplary embodiment in the present disclosure, steps may be formed between the first external electrode and the first external terminal and between the second external electrode and the second external terminal, respectively, in a direction connecting the first and second external electrodes.

In an exemplary embodiment in the present disclosure, a total width of the alumina chip may be shorter than a total width of the multilayer capacitor.

In an exemplary embodiment in the present disclosure, steps may be formed between the first external electrode and the first external terminal and between the second external electrode and the second external terminal, respectively, in a direction intersecting the direction connecting the first and second external electrodes.

In an exemplary embodiment in the present disclosure, the capacitor body may include a plurality of dielectric layers and a plurality of first and second internal electrodes alternately disposed with the dielectric layer interposed therebetween, and has first and second surfaces opposing each other, third and fourth surfaces connected to the first and second surfaces and opposing each other, and fifth and sixth surfaces connected to the first and second surfaces, connected to the third and fourth surfaces, and opposing each other, one ends of the first and second internal electrodes being exposed through the third and fourth surfaces, respectively, and the chip body may include a plurality of dielectric layers and a plurality of third and fourth internal electrodes alternately disposed with the dielectric layer interposed therebetween, and has seventh and eighth surfaces opposing each other, ninth and tenth surfaces connected to the seventh and eighth surfaces and opposing each other, and eleventh and twelfth surfaces connected to the seventh and eighth surfaces, connected to the ninth and tenth surfaces and opposing each other, one ends of the third and fourth internal electrodes being exposed through the ninth and tenth surfaces, respectively.

In an exemplary embodiment in the present disclosure, the first and second external electrodes may include first and second connection portions disposed on the third and fourth surfaces of the capacitor body, respectively, and first and second band portions extending from the first and second connection portions to a portion of the first surface of the capacitor body, respectively, and the first and second external terminals may include third and fourth connection portions disposed on the ninth and tenth surfaces of the chip body, respectively, and third and fourth band portions extending from the third and fourth connection portions to portions of seventh and eighth surfaces of the chip body, respectively.

The first band portion may be connected to the third band portion, and the second band portion may be connected to the fourth band portion.

In an exemplary embodiment in the present disclosure, the multilayer electronic component may further include plating layers respectively disposed on surfaces of the first and second external electrodes and the first and second external terminals.

According to another exemplary embodiment in the present disclosure, a mounting board of a multilayer electronic component may include a board having first and second electrode pads on one surface thereof; and a multilayer electronic component to be mounted such that first and second external terminals are connected on the first and second electrode pads, respectively.

According to another exemplary embodiment in the present disclosure, a multilayer electronic component includes a first body including a plurality of dielectric layers and a plurality of first and second internal electrodes alternately disposed with the dielectric layer interposed therebetween and having first and second surfaces opposing each other, third and fourth surfaces connected to the first and second surfaces and opposing each other, and fifth and sixth surfaces connected to the first and second surfaces, connected to the third and fourth surfaces, and opposing each other, one ends of the first and second internal electrodes being exposed through the third and fourth surfaces, respectively; a second body bonded to the first body, including alumina, and having seventh and eighth surfaces opposing each other, ninth and tenth surfaces connected to the seventh and eighth surfaces and opposing each other, and eleventh and twelfth surfaces connected to the seventh and eighth surfaces, connected to the ninth and tenth surfaces and opposing each other, the first surface of the first body and the eighth surface of the second body facing each other; a first plating layer extending from a portion of the second surface of the body to a portion of seventh surface of the second body, and covering the third surface of the body and the ninth surface of the second body; and a second plating layer extending from another portion of the second surface of the body to another portion of seventh surface of the second body, and covering the fourth surface of the body and the tenth surface of the second body.

The first plating layer may include a first nickel plating layer disposed on the first external electrode and the first external terminal and a first tin plating layer disposed on the first nickel plating layer, and the second plating layer may include a second nickel plating layer disposed on the second external electrode and the second external terminal and a second tin plating layer disposed on the second nickel plating layer.

A length, in a direction from the ninth surface to the tenth surface, of the second body may be shorter than a length, in a direction from the third surface to the fourth surface, of the first body.

The third surface of the first body and the ninth surface of the second body may have a step, and the fourth surface of the first body and the tenth surface of the second body may have a step.

A width, in a direction from the eleventh surface to the twelfth surface, of the second body may be shorter than a width, in a direction from the fifth surface to the sixth surface, of the first body.

The fifth surface of the first body and the eleventh surface of the second body may be disposed on a same side and have a step, and the sixth surface of the first body and the twelfth surface of the second body may be disposed on a same side and have a step.

The second body may include a plurality of dielectric layers and a plurality of third and fourth internal electrodes alternately disposed with the dielectric layer interposed therebetween. Ends of the third and fourth internal electrodes may be exposed through the ninth and tenth surfaces, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
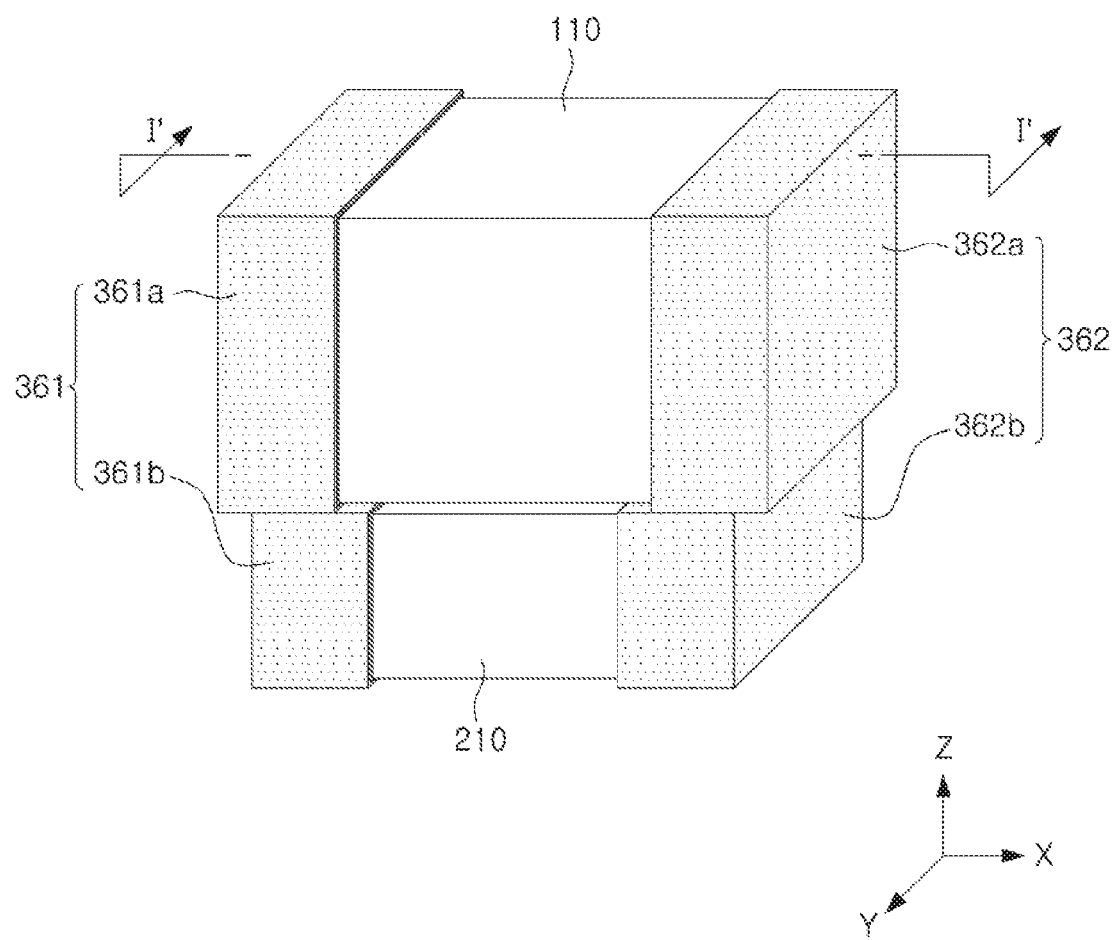
FIG. 1 is a perspective view of a multilayer electronic component according to an exemplary embodiment in the present disclosure.

Hereinafter, exemplary embodiments of the present disclosure will be described in detail with reference to the accompanying drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

In the drawings, the shapes and dimensions of elements may be exaggerated for clarity.

Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

Hereinafter, when a direction is defined to clearly explain an exemplary embodiment in the present disclosure, X, Y and Z shown in figures represent a length direction, a width direction and a thickness direction of a capacitor body 110, respectively. Further, in the present exemplary embodiment, the Z direction may be conceptually the same as a laminating direction in which dielectric layers are laminated.

Figure 2:
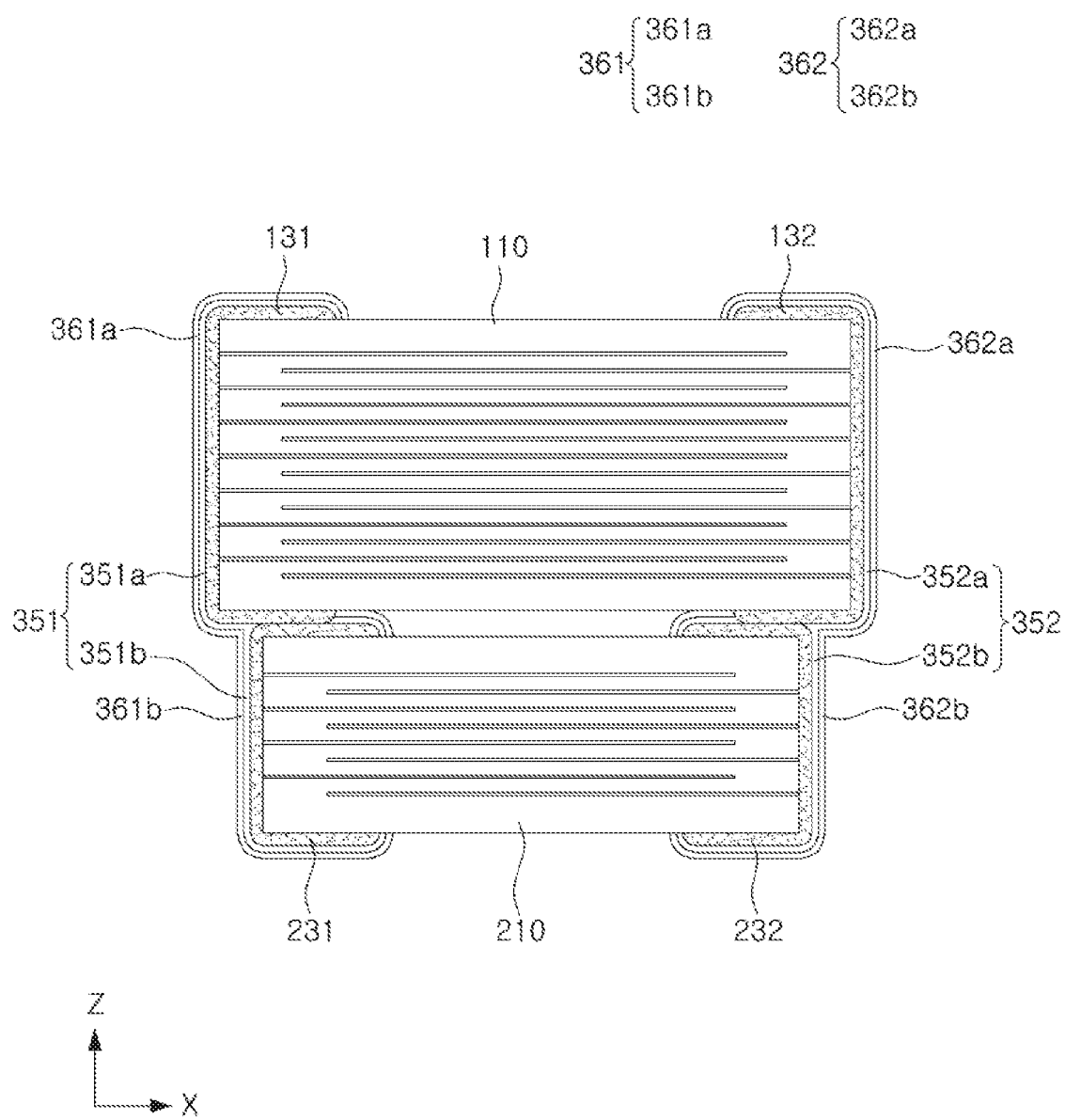
FIG. 2 is a cross-sectional view taken along line I-I' of FIG. 1.
Figure 3:
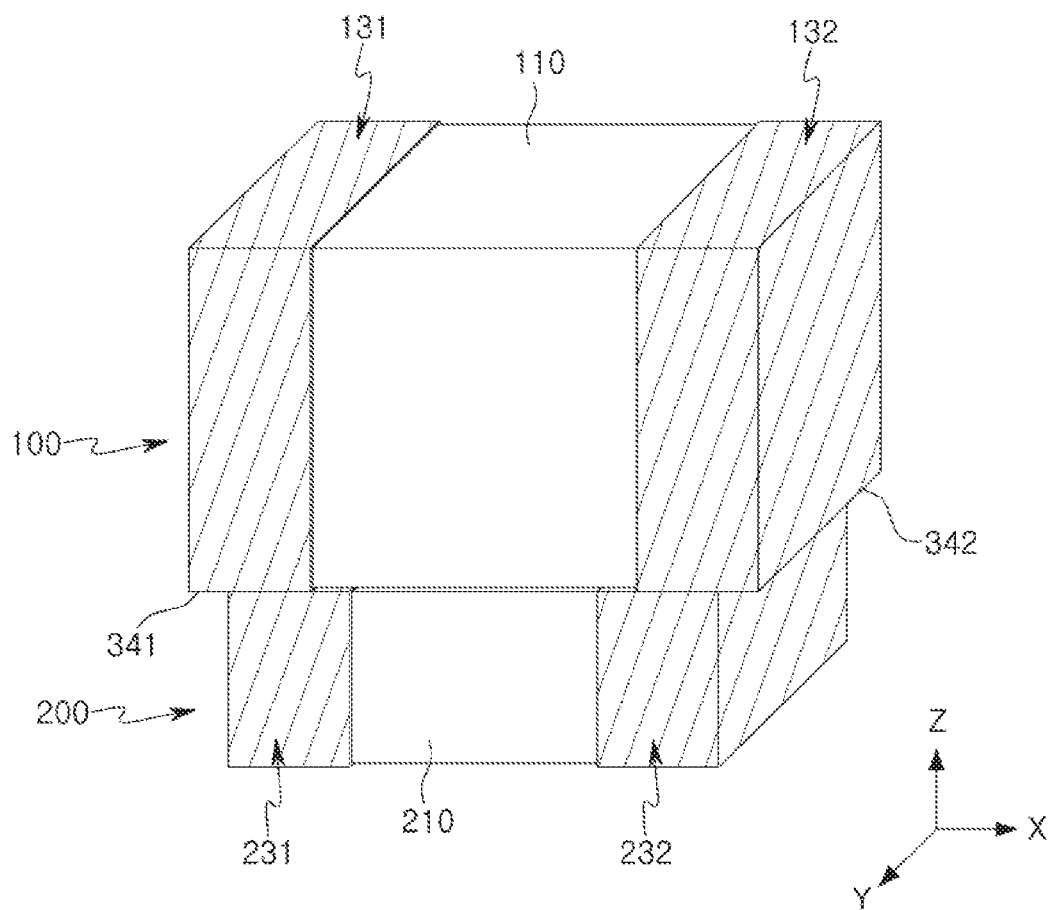
FIG. 3 is a perspective view illustrating a state in which a multilayer capacitor and an alumina chip are coupled.
Figure 4:
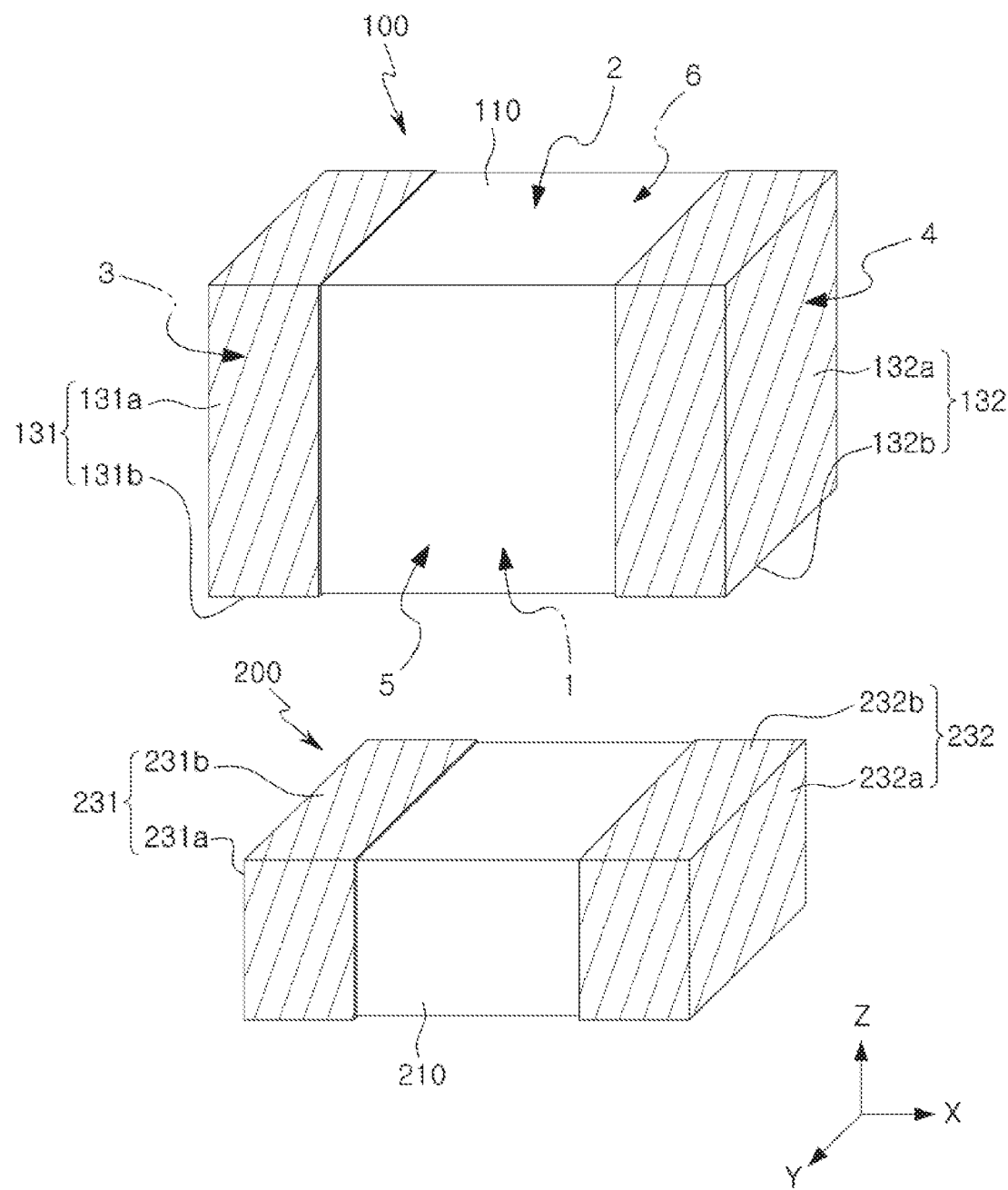
FIG. 4 is an exploded perspective view of FIG. 3.

FIG. 1 is a perspective view of a multilayer electronic component according to an exemplary embodiment in the present disclosure, FIG. 2 is a cross-sectional view taken along line I-I' in FIG. 1, FIG. 3 is a perspective view illustrating a state in which a multilayer capacitor and an alumina chip are coupled, and FIG. 4 is an exploded perspective view of FIG. 3.

Referring to FIGS. 1 to 4, a multilayer electronic component according to an exemplary embodiment in the present disclosure may include a multilayer capacitor 100 and an alumina chip 200.

The multilayer electronic component in the present disclosure may include first and second plating layers to be described later, such that the multilayer capacitor 100 and the alumina chip 200 may be integrally coupled.

The multilayer capacitor 100 may include a capacitor body 110 and first and second external electrodes 131 and 132 formed at both ends of the capacitor body 110 in an X direction.

Figure 5:
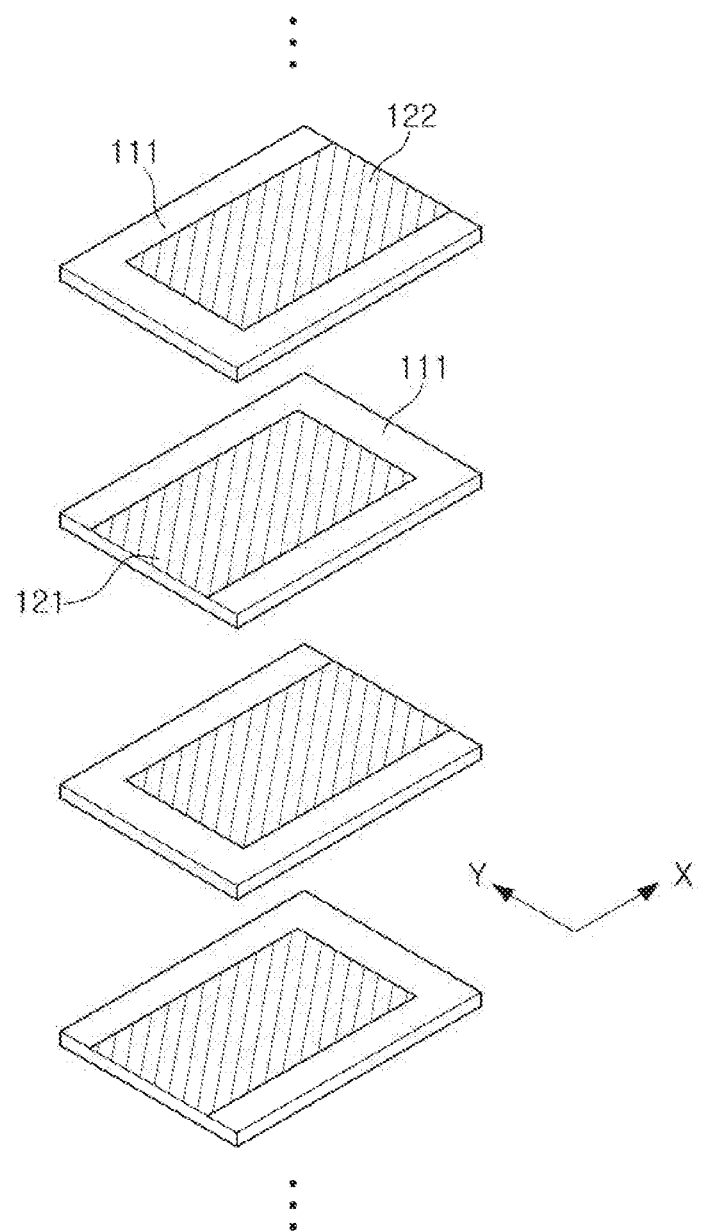
FIG. 5 is an exploded perspective view illustrating laminated structures of first and second internal electrodes of a multilayer capacitor.

Further referring to FIG. 5, the capacitor body 110 may be formed by laminating a plurality of dielectric layers 111 in a Z direction, and then sintering the plurality of laminated dielectric layers 111, and may be integrated such that boundaries therebetween may not be confirmed with the naked eye.

In this case, the capacitor body 110 may have a generally hexahedral shape, but the present disclosure is not limited thereto. In addition, the shape and dimensions of the capacitor body 110 and the number of laminated layers of the dielectric layer 111 are not limited to those illustrated in the drawings.

In the present exemplary embodiment, for convenience of explanation, both surfaces of the capacitor body 110 opposing each other in the Z direction are defined as first and second surfaces 1 and 2, both surfaces connected to the first and second surfaces 1 and 2 and opposing each other in the X direction are defined as third and fourth surfaces 3 and 4, and both surfaces connected to the first and second surfaces 1 and 2, connected to the third and fourth surfaces 3 and 4, and opposing each other in the Y direction are defined as fifth and sixth surfaces 5 and 6. In addition, in the present exemplary embodiment, the first surface 1 may be a surface in a mounting direction.

The dielectric layer 111 may include a ceramic material having a high dielectric constant, for example, a barium titanate ($BaTiO_3$)-based ceramic powder, or the like, but, the present disclosure is not limited thereto.

At this time, the $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like is partially solid-dissolved in $BaTiO_3$, and the present disclosure is not limited thereto.

In addition, a ceramic additive, an organic solvent, a plasticizer, a binding agent, a dispersant, and the like, may further be added to the dielectric layer 111, together with the ceramic powder.

The ceramic additive, may be, for example, a transition metal oxide or a transition metal carbide, a rare earth element, magnesium (Mg), aluminum (Al), or the like.

The first and second internal electrodes 121 and 122 are electrodes having different polarities from each other, may be alternately disposed in the Z direction with the dielectric layer 111 interposed therebetween, and one ends thereof may be exposed through third and fourth surfaces of the capacitor body 110, respectively.

In this case, the first and second internal electrodes 121 and 122 may be electrically insulated from each other by the dielectric layer 111 disposed in the middle.

End portions of the first and second internal electrodes 121 and 122 alternately exposed through the third and fourth surfaces 3 and 4 of the capacitor body 110 may be respectively connected to the first and second external electrodes 131 and 132 disposed on the third and fourth surfaces 3 and 4 of the capacitor body 110, described below, to be electrically connected.

In this case, the first and second internal electrodes 121 and 122 may be formed of a conductive metal such as nickel (Ni), a nickel (Ni) alloy, or the like, but the present disclosure is not limited thereto.

According to such a configuration, when a predetermined voltage is applied to the first and second external electrodes, charges are accumulated between the first and second internal electrodes 121 and 122.

In this case, the capacitance of the multilayer electronic component 100 may be proportional to an area of overlap of the first and second internal electrodes 121 and 122 overlapping with each other in the Z direction.

On the other hand, in the present exemplary embodiment, the internal electrodes of the capacitor body 110 are disposed to be in a horizontal direction with respect to the mounting surface, however, the internal electrodes of the present disclosure may be disposed to be perpendicular to the mounting surface, as required.

The first and second external electrodes 131 and 132 are provided with voltages of different polarities and may be connected to exposed portions of the first and second internal electrodes 121 and 122, respectively, to be electrically connected thereto.

A plating layer may be formed on the surfaces of the first and second external electrodes 131 and 132, as required.

For example, the first and second external electrodes 131 and 132 may include a conductive layer directly connected to the first and second internal electrodes 121 and 122, respectively, in contact with a surface of the capacitor body 110, a nickel (Ni) plating layer formed on the conductive layer, and a tin (Sn) plating layer formed on the plating layer.

The first and second external electrodes 131 and 132 may include first and second connection portions 131a and 132a and first and second band portions 131b and 132b.

The first and second connection portions 131a and 132a may be formed on the third and fourth surfaces of the capacitor body 110, respectively, and are connected to the first and second internal electrodes 121 and 122.

The first and second band portions 131b and 132b may extend from the first and second connection portions 131a and 132a to a portion of the first surface of the capacitor body 110 to be bonded to the first and second external terminals 231 and 232.

The first and second band portions 131b and 132b may further extend to a portion of the second surface 2 and portions of the fifth and sixth 5 and 6 surfaces of the capacitor body 110, respectively, to improve fixing strength, as required.

In addition, a plating layer may be formed on the surfaces of the first and second external electrodes 131 and 132. For example, the plating layer may include a nickel plating layer and a tin plating layer formed on the nickel plating layer.

The alumina chip 200 may include a chip body 210 made of alumina ($Al_2O_3$) having high rigidity and first and second external terminals 231 and 232 formed at both end portions of the chip body 210 in the X direction.

Figure 6:
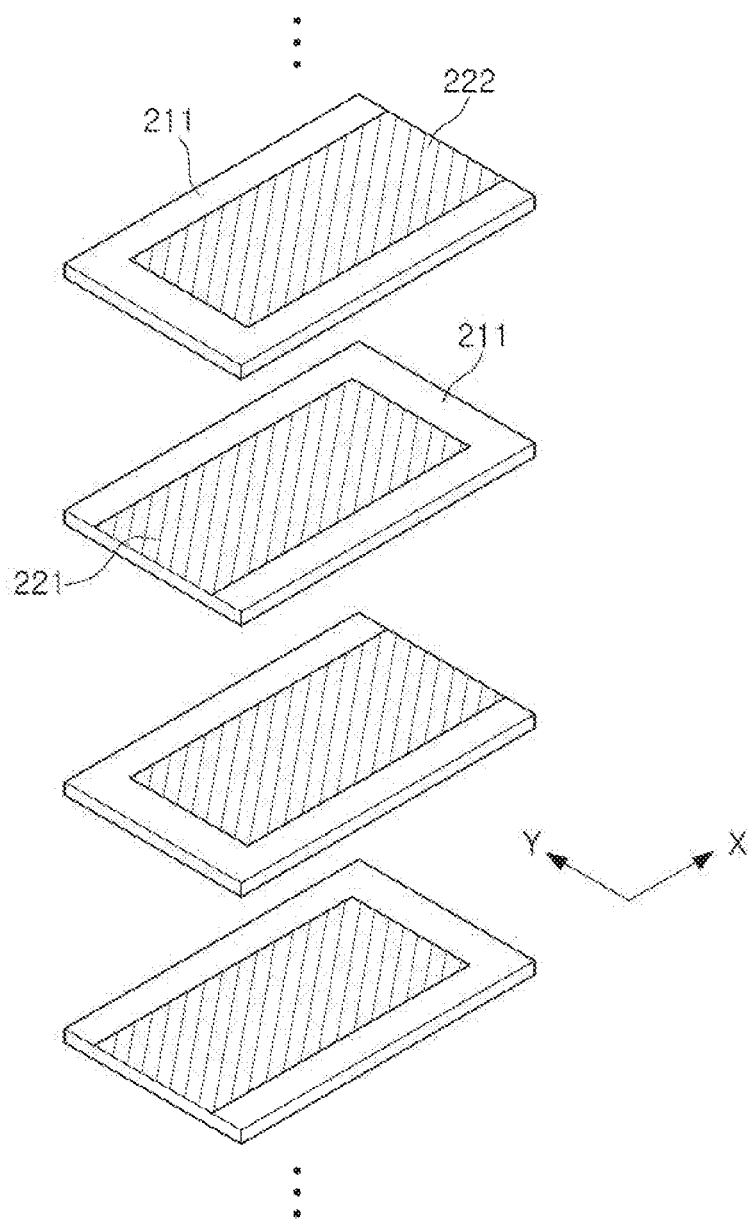
FIG. 6 is an exploded perspective view illustrating laminated structures of third and fourth internal electrodes of an alumina chip.

Further referring to FIG. 6, the chip body 210 may be formed by laminating a plurality of dielectric layers 211 in the Z direction, and then sintering the plurality of laminated dielectric layers 211, and may be integrated such that boundaries therebetween may not be confirmed with the naked eye.

In this case, the chip body 210 may have a generally hexahedral shape, but the present disclosure is not limited thereto. In addition, the shape and dimensions of the chip body 210 and the number of laminated layers of the dielectric layer 211 are not limited those illustrated in the drawings.

In the present exemplary embodiment, for convenience of explanation, both surfaces of the chip body 210 opposing each other in the Z direction are defined as seventh and eighth surfaces, both surfaces connected to the seventh and eighth surfaces and opposing each other in the X direction are defined as ninth and tenth surfaces, and both surfaces connected to the seventh and eighth surfaces, connected to the ninth and tenth surfaces, and opposing each other in the Y direction are defined as eleventh and twelfth surfaces. In the present exemplary embodiment, the seventh surface may be a mounting surface.

The third and fourth internal surfaces 221 and 222 are electrodes having different polarities from each other, may be alternately disposed to oppose each other in the Z direction with the dielectric layer 211 interposed therebetween, and one ends thereof may be exposed through ninth and tenth surfaces of the chip body 210, respectively.

In this case, the third and fourth internal electrodes 221 and 222 may be electrically insulated from each other by the dielectric layer 211 disposed in the middle.

End portions of the third and fourth internal electrodes 221 and 222 alternately exposed through the ninth and tenth surfaces of the chip body 210 may be respectively connected to the first and second external electrodes 231 and 232 disposed on the ninth and tenth surfaces of the chip body 210, described below, to be electrically connected thereto.

In this case, the third and fourth internal electrodes 221 and 222 may be formed a conductive metal such as nickel (Ni), a nickel (Ni) alloy, or the like, but the present disclosure is not limited thereto.

On the other hand, in the present exemplary embodiment, the internal electrodes of the chip body 210 may be disposed to be in a horizontal direction with respected to the mounting surface; however, the internal electrodes of the present disclosure may be disposed to be perpendicular to the mounting surface, as required.

The first and second external terminals 231 and 232 may be provided with voltages of different polarities, and may be connected to exposed portions of the third and fourth internal electrodes 221 and 222, respectively, to be electrically connected thereto.

A plating layer may be formed on the surfaces of the first and second external terminals 231 and 232, as required.

For example, the first and second external terminals 231 and 232 may include a conductive layer directly connected to the third and fourth internal electrodes 221 and 222, respectively, in contact with the surface of the chip body 210, a nickel (Ni) plating layer formed on the conductive layer, and a tin (Sn) plating layer formed on the nickel plating layer.

The first and second external terminals 231 and 232 may include third and fourth connection portions 231a and 232a and third and fourth band portions 231b and 232b.

The third and fourth connection portions 231a and 232a may be formed on the ninth and tenth surfaces of the chip body 210, respectively, and are connected to the third and fourth internal electrodes 221 and 222.

The third and fourth band portions 231b and 232b may extend from the third and fourth connection portions 231a and 232a to portions of the seventh and eighth surfaces of the chip body to be bonded to the first and second external electrodes 131 and 132.

The third and fourth band portions 231b and 232b may further extend to portions of the eleventh and twelfth surfaces of the chip body 210, to improve fixing strength, as required.

In addition, a plating layer may be formed on the surfaces of the first and second external terminals 231 and 232. For example, the plating layer may include a nickel plating layer and a tin plating layer formed on the nickel plating layer.

The alumina chip 200 is attached to the first surface of the multilayer capacitor 100, which is a mounting direction to prevent vibration of the multilayer capacitor 100 from being transmitted to the board. Therefore, the acoustic noise of the multilayer capacitor 100 may be reduced.

In this case, an overall length, in the X direction, of the alumina chip 200 may be formed to be shorter than an overall length, in the X direction, of the multilayer capacitor 100.

Therefore, steps 341 and 342 may be formed between the first external electrode 131 and the first external terminal 231 and between the second external electrode 231 and the second external terminal 232 in the X direction, respectively.

In addition, a total width, in the Y direction, of the alumina chip 200 may be formed to be shorter than a total width, in the Y direction, of the multilayer capacitor 100.

Therefore, steps 341 and 342 may also be formed between the first external electrode 131 and the first external terminal 231 and between the second external electrode 231 and the second external terminal 232 in the Y direction, respectively.

Such steps 341 and 342 may act as solder pockets.

On the other hand, when the multilayer capacitor 100 and the alumina chip 200 are vertically bonded, a problem of fixing strength may occur.

In the present exemplary embodiment, the first and second external electrodes 131 and 132 of the multilayer capacitor 100 and the first and second external terminal 231 and 232 of the alumina chip 200 are attached to each other and further plated, and a first plating layer and a second plating layer are formed, to improve fixing strength of the multilayer capacitor 100 and the alumina chip 200.

The first plating layer covers the first external electrode 131 and the first external terminal 231 at the same time, and may be integrally formed with the first external electrode 131 and the first external terminal 231.

The second plating layer covers the second external electrode 132 and the second external terminal 232 at the same time, and may be integrally formed with the second external electrode 132 and the second external terminal 232.

In this case, the first and second plating layers may include nickel plating layers 351 and 352 and tin plating layers 361 and 362.

The nickel plating layers 351 and 352 may be integrally formed by connecting portions 351a and 352a formed on the first and second external electrodes 131 and 132 and portions formed on the first and second external terminals 231 and 232 from each other.

The tin plating layers 361 and 362 may be respectively formed on the nickel plating layers 351 and 352, and may be integrally formed by connecting portions 361a and 362a formed at positions corresponding to the first and second external electrodes 131 and 132 and portions 361b and 362b formed at positions corresponding to the first and second external terminals 231 and 232 from each other.

When the nickel plating layer is omitted and only the tin plating layer is formed by the first and second plating layers, tin components are melted at the time of a reflow process, to be described later, such that the effect of fixing the multilayer capacitor of the first and second plating layers and the alumina chip may be insufficient.

On the other hand, solder is used for bonding the multilayer capacitor 100 and the alumina chip 200, and a reflow process is performed in the heat treatment for melting the solder.

However, when heat treatment is performed, and solder will be exposed to high temperature, oxidation occurs in the pre-formed plating layer of the first and second external electrodes 131 and 132 of the multilayer capacitor 100 and the first and second external terminals 231 and 232 of the alumina chip 200.

As described above, when the first and second external electrodes 131 and 132 and the first and second external terminals 231 and 232 are oxidized, a mounting failure may occur when mounting on the board.

In the present exemplary embodiment, the first and second external electrodes 131 and 132 of the multilayer capacitor 100 and the first and second external terminals 231 and 232 of the alumina chip 200 may be bonded, and then plating may further be performed thereon to further form the first and second plating layers. Therefore, the problem of the mounting failure which may occur when mounting on the board due to the oxidation film may be prevented.

On the other hand, when the piezoelectric vibrations of the multilayer capacitor may be proportional to the magnitude of the acoustic noise in the solder formed on the connection portion of the external electrode in the process of being transferred to the substrate.

In the present exemplary embodiment, the height of the solder used for mounting the multilayer electronic component on the board by the first and second plating layers is lower than that in the case in which the first and second plating layers are not formed, such that the acoustic noise reduction effect may be further provided.

Figure 7:
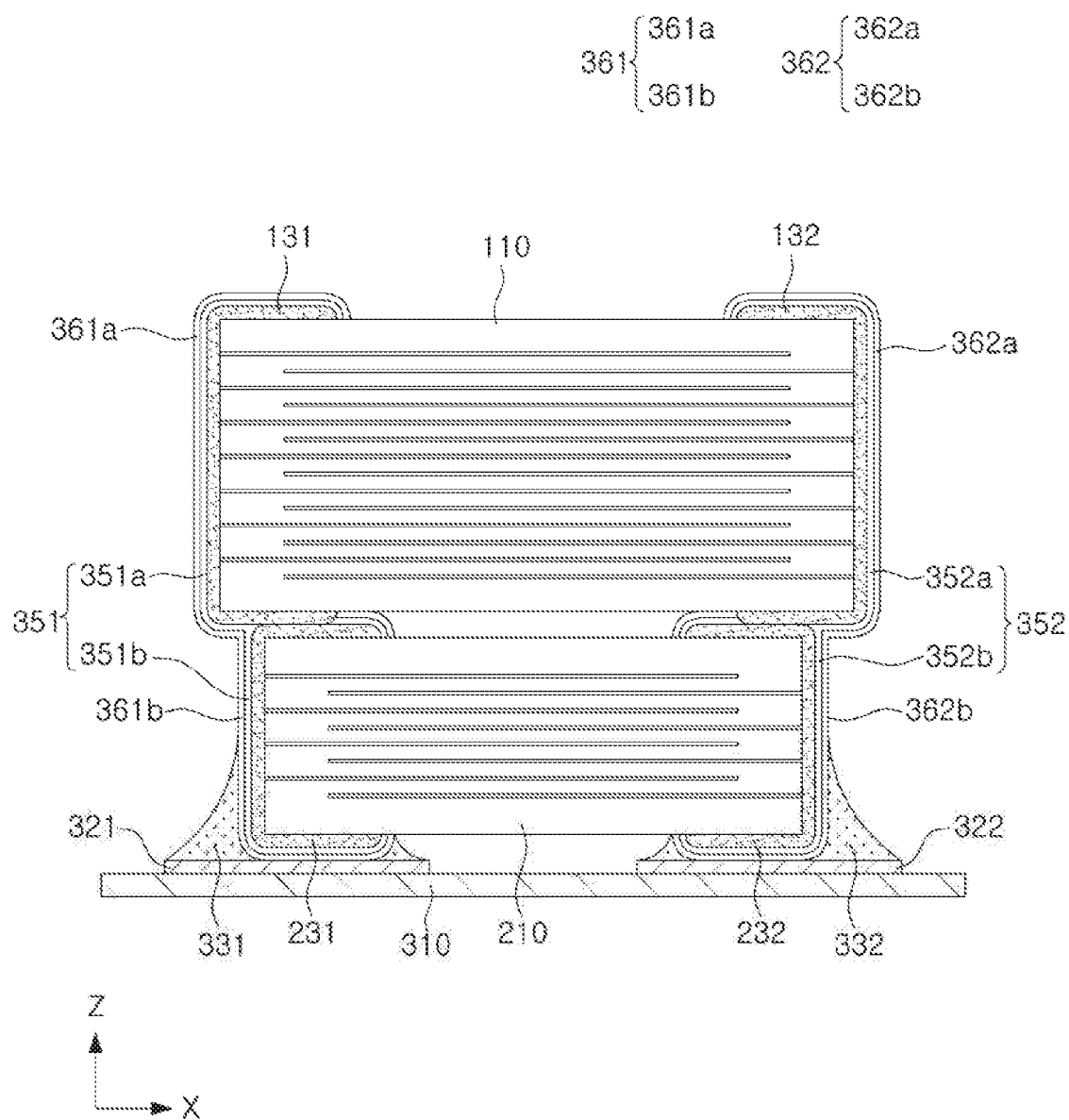
FIG. 7 is a cross-sectional view illustrating a state in which the multilayer electronic component of FIG. 2 is mounted on a board.

Referring to FIG. 7, the mounting board of the multilayer electronic component according to the present exemplary embodiment may include a board 310 having first and second electrode pads 321 and 322 on one surface thereof, and the first and second external terminals 231 and 232 of the alumina chip 200 are respectively mounted to be located on the first and second electrode pads 321 and 322.

In this case, the first and second electrode pads 321 and 322 may be connected to the tin plating layers 361b and 362b of the first and second plating layers plated on the surfaces of the first and second external terminals 231 and 232, respectively, to be electrically connected.

On the other hand, in the present exemplary embodiment, the multilayer electronic component is mounted on the board 310 by the solders 331 and 332, but a conductive paste may be used instead of the solders 331 and 332, as required.

When a voltage having different polarities is applied to the first and second external electrodes 131 and 132 formed on the multilayer electronic component in a state in which the multilayer electronic component 100 is mounted on the board 310, the capacitor body 110 expand and contracts in the Z direction by an inverse piezoelectric effect of the dielectric layer 111.

Both end portions of the first and second external electrodes 131 and 132 may contract and expand in an inverse manner to the expansion and contraction of the capacitor body 110 in the Z direction due to the Poisson effect.

Such contraction and expansion cause vibration. In addition, the vibration may be transmitted to the board 310 through the first and second external electrodes 131 and 132 and the first and second external terminals 231 and 232, such that the sound may be radiated from the board 310 to become acoustic noise.

However, according to an exemplary embodiment in the present disclosure, the steps 341 and 342 may be formed at a lower surface of the capacitor body 110 due to the difference in length or width of the first and second external electrodes 131 and 132 and the first and second external terminals 231 and 232 may be formed, and the steps 341 and 342 may serve as solder pockets capable of trapping the solder at the time of mounting on the board.

The solder pocket may prevent the solders 331 and 332 from climbing over the first and second connection portions 131a and 132a of the first and second external electrodes 131 and 132 of the multilayer capacitor 100, thereby reducing the amount of transmission of the piezoelectric vibration.

For example, when the amount of the solders 331 and 332 is large or the thickness of the chip body 210 is small, the solders 341 and 342 may be effectively trapped to the steps 341 and 342, such that formation of a solder fillet directed toward the upper surface of the capacitor body 110 may be suppressed.

Therefore, a piezoelectric vibration transfer path of the multilayer electronic component 100 may be blocked, and the solder fillet and a maximum displacement point in the capacitor body 110 may be spaced apart from each other to improve an acoustic noise reducing effect of the multilayer electronic component 100.

In addition, according to the present exemplary embodiment, a vibration amount of the piezoelectric vibrations of the multilayer electronic component transferred to the board at an audio frequency within 20 kHz may be effectively suppressed, by the acoustic noise reducing structure.

Therefore, the malfunction of the sensors, which may be a problem due to the high frequency vibration of 20 kHz or more in information technology (IT) and industrial/electrical fields, and an accumulation of internal fatigue of the sensors due to vibrations for a long time may be suppressed and the credibility may be improved.

As set forth above, according to an exemplary embodiment in the present disclosure, an external terminal of an alumina chip is bonded to a lower portion of an external electrode of a multilayer capacitor, and plating is performed such that the external electrode and the external terminal are covered by the plating layer at the same time, thereby reducing the acoustic noise while securing the fixing strength between the multilayer capacitor and the alumina chip.

While exemplary embodiments have been shown and described above, it will be apparent to those skilled in the art that modifications and variations could be made without departing from the scope of the present invention, as defined by the appended claims.

What is claimed is:
1. A multilayer electronic component comprising:
a multilayer capacitor including a capacitor body and first and second external electrodes disposed on ends of the capacitor body, respectively;
an alumina chip including a chip body and first and second external terminals disposed on ends of the chip body, respectively, the first and second external terminals being in direct contact with the first and second external electrodes, respectively;
a first plating layer covering the first external electrode and the first external terminal; and a second plating layer covering the second external electrode and the second external terminal.

2. The multilayer electronic component of claim 1, wherein the first plating layer includes a first nickel plating layer disposed on the first external electrode and the first external terminal and a first tin plating layer disposed on the first nickel plating layer, and the second plating layer includes a second nickel plating layer disposed on the second external electrode and the second external terminal and a second tin plating layer disposed on the second nickel plating layer.

3. The multilayer electronic component of claim 1, wherein an overall length of the alumina chip is shorter than an overall length of the multilayer capacitor.

4. The multilayer electronic component of claim 1, wherein steps are provided between the first external electrode and the first external terminal and between the second external electrode and the second external terminal, respectively, in a direction connecting the first and second external electrodes.

5. The multilayer electronic component of claim 1, wherein a total width of the alumina chip is shorter than a total width of the multilayer capacitor.

6. The multilayer electronic component of claim 1, wherein steps are formed between the first external electrode and the first external terminal and between the second external electrode and the second external terminal, respectively, in a direction intersecting the direction connecting the first and second external electrodes.

7. The multilayer electronic component of claim 1, wherein the capacitor body comprises a plurality of dielectric layers and a plurality of first and second internal electrodes alternately disposed with the dielectric layer interposed therebetween and having first and second surfaces opposing each other, third and fourth surfaces connected to the first and second surfaces and opposing each other, and fifth and sixth surfaces connected to the first and second surfaces, connected to the third and fourth surfaces, and opposing each other, one ends of the first and second internal electrodes being exposed through the third and fourth surfaces, respectively, and the chip body comprises a plurality of dielectric layers and a plurality of third and fourth internal electrodes alternately disposed with the dielectric layer interposed therebetween and having seventh and eighth surfaces opposing each other, ninth and tenth surfaces connected to the seventh and eighth surfaces and opposing each other, and eleventh and twelfth surfaces connected to the seventh and eighth surfaces, connected to the ninth and tenth surfaces and opposing each other, one ends of the third and fourth internal electrodes being exposed through the ninth and tenth surfaces, respectively.

8. The multilayer electronic component of claim 7, wherein the first and second external electrodes comprise first and second connection portions respectively disposed on the third and fourth surfaces of the capacitor body and first and second band portions extending from the first and second connection portions to a portion of the first surface of the capacitor body, respectively, and the first and second external terminals comprise third and fourth connection portions respectively disposed on the ninth and tenth surfaces of the chip body and third and fourth band portions extending from the third and fourth connection portions to portions of the seventh and eighth surfaces of the chip body, respectively.

9. The multilayer electronic component of claim 8, wherein the first band portion is connected to the third band portion, and the second band portion is connected to the fourth band portion.

10. The multilayer electronic component of claim 1, further comprising plating layers respectively disposed on the surfaces of the first and second external electrodes and the first and second external terminals.

11. A mounting board of a multilayer electronic component comprising:
a board having first and second electrode pads on one surface; and
the multilayer electronic component of claim 1 disposed in such a manner that the first and second external terminals are connected on the first and second electrode pads, respectively.

12. A multilayer electronic component comprising:
a first body including a plurality of dielectric layers and a plurality of first and second internal electrodes alternately disposed with the dielectric layer interposed therebetween and having first and second surfaces opposing each other, third and fourth surfaces connected to the first and second surfaces and opposing each other, and fifth and sixth surfaces connected to the first and second surfaces, connected to the third and fourth surfaces, and opposing each other, one ends of the first and second internal electrodes being exposed through the third and fourth surfaces, respectively;
a second body bonded to the first body, including alumina, and having seventh and eighth surfaces opposing each other, ninth and tenth surfaces connected to the seventh and eighth surfaces and opposing each other, and eleventh and twelfth surfaces connected to the seventh and eighth surfaces, connected to the ninth and tenth surfaces and opposing each other, the first surface of the first body and the eighth surface of the second body facing each other;
a first plating layer extending from a portion of the second surface of the body to a portion of seventh surface of the second body, and covering the third surface of the body and the ninth surface of the second body; and
a second plating layer extending from another portion of the second surface of the body to another portion of seventh surface of the second body, and covering the fourth surface of the body and the tenth surface of the second body,
wherein the third surface of the first body and the ninth surface of the second body have a step, and the fourth surface of the first body and the tenth surface of the second body have a step.

13. The multilayer electronic component of claim 12, wherein the first plating layer includes a first nickel plating layer disposed on the first external electrode and the first external terminal and a first tin plating layer disposed on the first nickel plating layer, and the second plating layer includes a second nickel plating layer disposed on the second external electrode and the second external terminal and a second tin plating layer disposed on the second nickel plating layer.

14. The multilayer electronic component of claim 12, wherein a length, in a direction from the ninth surface to the tenth surface, of the second body is shorter than a length, in a direction from the third surface to the fourth surface, of the first body.

15. The multilayer electronic component of claim 12, wherein a width, in a direction from the eleventh surface to the twelfth surface, of the second body is shorter than a width, in a direction from the fifth surface to the sixth surface, of the first body.

16. The multilayer electronic component of claim 12, wherein the fifth surface of the first body and the eleventh surface of the second body are disposed on a same side and have a step, and the sixth surface of the first body and the twelfth surface of the second body are disposed on a same side and have a step.

17. The multilayer electronic component of claim 12, wherein the second body comprises a plurality of dielectric layers and a plurality of third and fourth internal electrodes alternately disposed with the dielectric layer interposed therebetween, and ends of the third and fourth internal electrodes are exposed through the ninth and tenth surfaces, respectively.

18. A multilayer electronic component comprising:

a multilayer capacitor including a capacitor body and first and second external electrodes disposed at least on ends of the capacitor body, respectively;

an alumina chip including a chip body and first and second external terminals disposed at least on ends of the chip body, respectively, the first and second external terminals being connected to the first and second external electrodes, respectively;

a first plating layer covering the first external electrode and the first external terminal; and a second plating layer covering the second external electrode and the second external terminal, wherein the first and second external electrodes respectively comprise first and second band portions disposed on a surface of the capacitor body facing the alumina chip, the first and second external terminals respectively comprise third and fourth band portions disposed a surface of the alumina chip facing the capacitor body, the first band portion is connected to the third band portion, and the second band portion is connected to the fourth band portion, a portion of the first plating layer covers an end portion of the first band portion and an end portion of the third band portion, and is disposed between the first band portion or the third band portion and the second band portion or the fourth band portion, and a portion of the second plating layer covers an end portion of the second band portion and an end portion of the fourth band portion, and is disposed between the first band portion or the third band portion and the second band portion or the fourth band portion.

19. The multilayer electronic component of claim 18, wherein steps are provided between the first external electrode and the first external terminal and between the second external electrode and the second external terminal, respectively, in a direction connecting the first and second external electrodes.

20. The multilayer electronic component of claim 18, wherein an overall length of the alumina chip is shorter than an overall length of the multilayer capacitor.

* * * * *